United States Patent [19]

Fage

[11] Patent Number: 4,860,956
[45] Date of Patent: Aug. 29, 1989

[54] THRUST REVERSER FOR AIRCRAFT JET ENGINE AND AIRCRAFT ENGINE EQUIPPED WITH SAID THRUST REVERSER

[75] Inventor: Etienne Fage, Jouy En Josas, France

[73] Assignee: The Dee Howard Co., San Antonio, Tex.

[21] Appl. No.: 84,910

[22] Filed: Aug. 13, 1987

[30] Foreign Application Priority Data

Sep. 25, 1986 [FR] France ............... 86 13377

[51] Int. Cl.⁴ .............................................. F02K 1/60
[52] U.S. Cl. ............... 239/265.19; 239/265.35
[58] Field of Search ............ 239/265.19, 265.33, 239/265.35, 265.39, 265.41; 60/39.32, 694, 685

[56] References Cited

U.S. PATENT DOCUMENTS

| | | | |
|---|---|---|---|
| 2,680,346 | 6/1954 | Michael | 60/39.32 |
| 3,243,126 | 3/1966 | Kuri et al. | 60/39.32 X |
| 3,892,358 | 7/1975 | Gisslen | 239/265.39 |
| 4,022,948 | 5/1977 | Smith et al. | 239/265.39 |
| 4,081,137 | 3/1978 | Sutton et al. | 239/127.3 |
| 4,422,605 | 12/1983 | Fage | 239/265.33 X |
| 4,592,508 | 6/1986 | Thornock | 239/265.19 |
| 4,799,623 | 1/1989 | Bruchez et al. | 239/265.41 |
| 4,813,608 | 3/1989 | Holowach et al. | 239/265.37 |

FOREIGN PATENT DOCUMENTS 2347361 4/1976 France .
2494775 11/1980 France .

Primary Examiner—Andres Kashnikow
Assistant Examiner—Patrick N. Burkhart
Attorney, Agent, or Firm—Pollock, Vande Sande & Priddy

[57] ABSTRACT

This invention relates to a thrust reverser for aircraft jet engine having at least one door mounted to the downstream end of the jet generator to pivot about an axis which is transverse and at least substantially diametral to said jet, the door being able to pivot between a retracted position and an extended position. According to the invention, an at least partially supple seal is provided between the opposite parts of the inner and outer surfaces, respectively, of the door and of the jet generator, the transverse section of the seal being continually adapted to the space between the door and the jet generator in retracted position of the door.

9 Claims, 2 Drawing Sheets

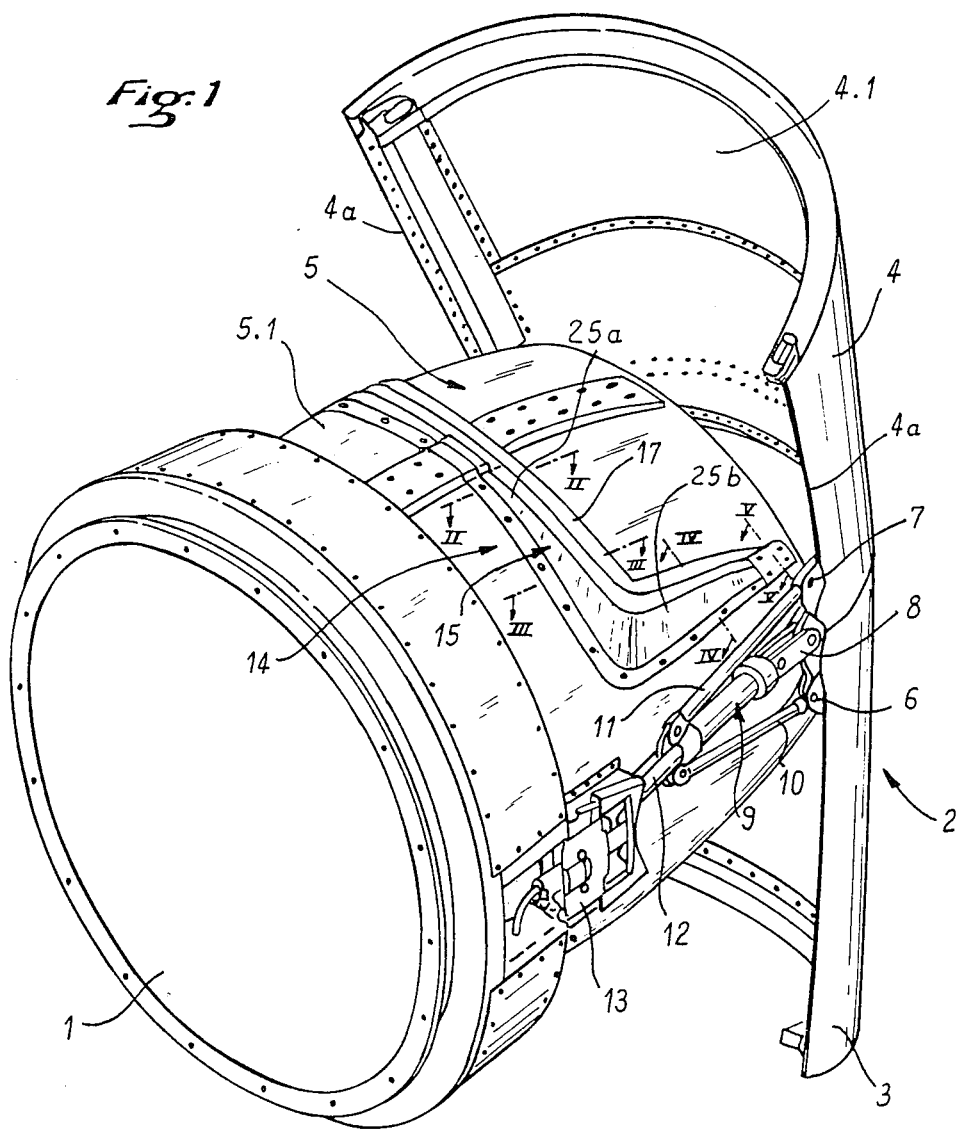
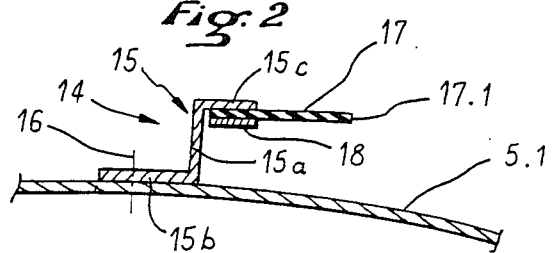

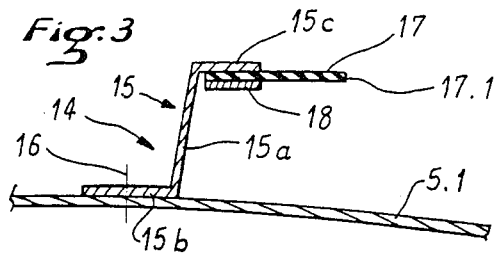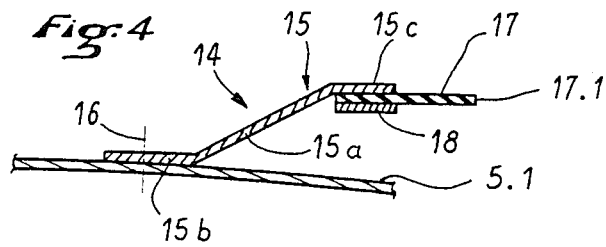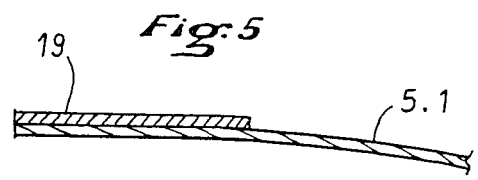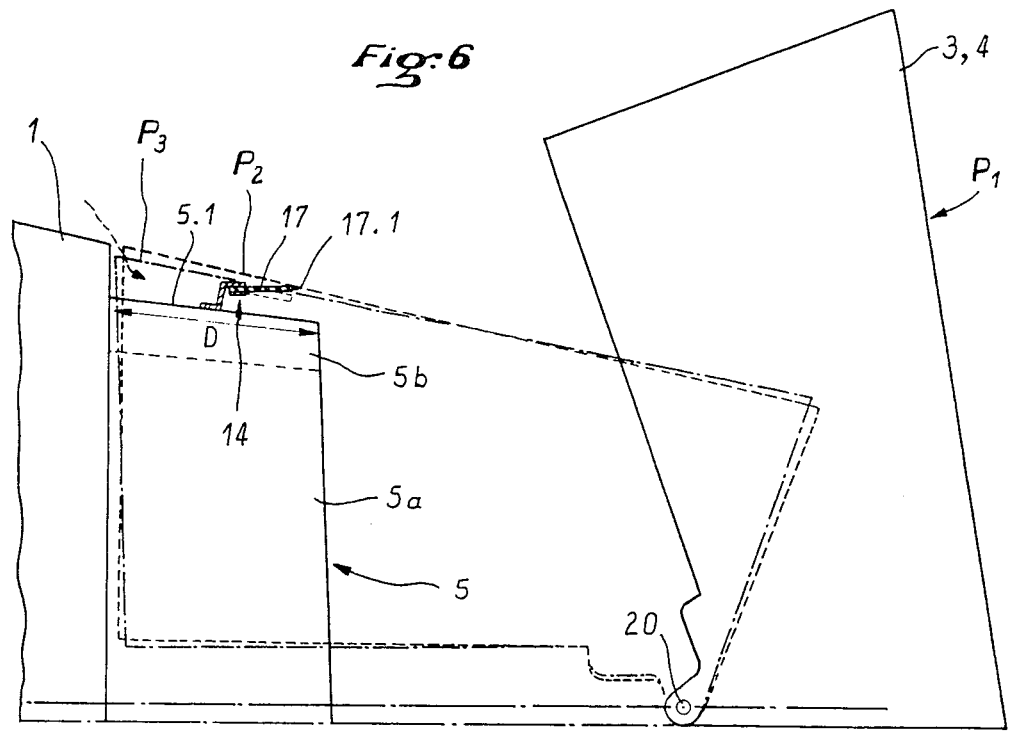

THRUST REVERSER FOR AIRCRAFT JET ENGINE AND AIRCRAFT ENGINE EQUIPPED WITH SAID THRUST REVERSER

FIELD OF THE INVENTION

The present invention relates to a thrust reverser for aircraft jet engine, as well as to an aircraft engin equipped with said thrust reverser.

BACKGROUND OF THE INVENTION

Known thrust reversers for aircraft jet engine comprise at least one door mounted at the downstream end of the jet generator to pivot about an axis which is transverse and at least substantially diametral to the jet from the jet generator, said door being adapted to pivot between a retracted position in which it forms a part of the nozzle of the engine and an extended position in which it is disposed at least substantially tranversely to said jet.

Three principal types of thrust reversers, in fact, exist:

a first type in which, in retracted position, the doors are disposed around the nozzle without modifying the latter, the extended position, corresponding to the thrust reversal, being obtained by the combinatin of a movement of recoil and a movement of rotation;

a second type in which the doors, in retracted position, form an extension of the nozzle, a simple rotation making it possible to pass into extended position corresponding to thrust reversal; and a third type described in French Pat. No. 2,348,371, in which the doors themselves form the terminal part of the nozzle without extending the latter, and a simple rotation of the doors about their pivot axis makes it possible, as in the second type, to pass from the folded position of the doors to their extended position, i.e. the position of thrust reversal, or vice versa.

Although operation of the nozzle is, in principle, not modified by a reverser of the first type, the same does not apply to the other systems, and theory and experience show that the obtaining of good performances depends, to different degrees depending on the particular embodiments, on the tightness existing between the nozzle proper and the doors of the reverser.

In a reverser of the third type, the static pressure prevailing in the space defined between the jet generator and the doors is virtually always higher than ambient pressure. It is then necessary to eliminate all the leakages towards the ambient air and to guarantee a tightness which is as perfect as possible between the jet generator and the doors of the reverser. However, in certain configurations, it may be advantageous to allow ambient air to penetrate in said space.

Moreover, in the case of a reverser whose doors form an extension of the nozzle (second type), said static pressure may become lower than ambient pressure, and it may be desirable, in order to obtain the greatest thrust possible, to allow all the ambient air which may be naturally sucked in to enter between the doors and the jet generator.

It is an object of the present invention to satisfy all the requirements set forth hereinabove.

SUMMARY OF THE INVENTION

To this end, the thrust reverser of the type described hereinabove is noteworthy, according to the invention, in that an at least partly supple seal is provided between the opposite parts of the inner and outer surfaces, respectively, of the door and of the jet generator, the transverse section of the seal being continually adapted to the space existing between the door and the jet generator in the retracted position of the door, and the seal being designed so that it is applied all the more strongly to the door, or to the jet generator, as the pressure existing in the space between the door and the jet generator in retracted position of the door is higher.

In this way, the seal according to the invention guarantees a perfect tightness when the pressure between the door and the jet generator is higher than ambient pressure, the seal being applied all the more strongly as said pressure is higher, and, furthermore, in the case of depression, the seal allows the ambient air to enter between the door and the jet generator.

According to another feature of the invention, the area defined by the seal between the opposite parts of the inner and outer surfaces, respectively, of the door and of the jet generator, is chosen as a function of the pressure capable of existing between the door and the jet generator, so as to limit the area of the inner surface of the door on which is exerted said pressure, and therefore the thrust outwardly exerted by the jet on the door.

This feature is particularly advantageous for a thrust reverser such as the one described in French Pat. No. 2,494,775, in which, in order to increase operational safety of said reverser, means are provided which guarantee that unlocking of the doors is possible only when the latter have firstly been brought into over-retracted position, the jack or jacks for controlling the position of the doors then having to be able to overcome the forces of thrust which are exerted on said doors, in particular the static pressure existing between the jet generator and the doors.

In that case, the thrust reverser comprising means for over-retracting the doors, said area defined by the seal may be determined so that the power of the over-retracting means may remain within acceptable limits in order not to attain an excessive value.

The seal is advantageously constituted by a rigid seal support fixed to the outer surface of the jet generator, and adaptable to contact the inner surface of the door, respectively, and by an elastic strip fixed, at one of its longitudinal edges, to said seal support. The other longitudinal edge of the strip is adapted to come into contact with the inner surface of the door.

In particular, the seal support being fixed to the outer surface of the jet generator, said seal support presents a central part which is at least substantially transverse to the jet generator and of which the curvature corresponds to that of the corresponding part of the outer surface of the jet generator, and two symmetrical lateral parts which are each disposed substantially at right angles with respect to said central part and which extend parallel to the lateral edges of the door and in the vicinity thereof in retracted position of the door.

The seal support may be constituted by a section presenting a web and inner and outer flanges, the inner flange serving for fixation of the support on the outer surface of the jet generator and the outer flange serving for fixation of said elastic strip.

In that case, the inclination of the web of the seal support with respect to a plane tangential to the outer surface of the jet generator may increase continuously from each end of the seal support to attain, in the vicinity of the center of the central part of the seal support, a value of approximately 90°.

Said elastic strip may advantageously be made of rubber or reinforced silicon.

The invention will be more readily understood on reading the following description with reference to the accompanying drawings, in which:

BRIEF DESCRIPTION OF THE DRAWINGS

FIG. 1 is a schematic view in perspective of an aircraft jet engine equipped with a thrust reverser, showing the arrangement of the seal according to the invention.

FIGS. 2, 3, 4 and 5 are schematic transverse sections of the seal according to the invention along lines II—II, III—III, IV—IV and V—V, respectively, of FIG. 1.

FIG. 6 schematically illustrates the different positions that may be taken by a door of the thrust reverser of FIG. 1.

DETAILED DESCRIPTION OF THE INVENTION

Referring now to the drawings, and in particular to FIG. 1, the jet engine 1 of an aircraft (not shown) is equipped with a thrust reverser 2 comprising two identical thrust reversal doors 3 and 4 articulated about a pin 20 (FIG. 6) which is transverse and at least substantially diametral with respect to the jet furnished by the jet generator 5 of the engine 1.

To this end, doors 3 and 4 comprise, on one side, hinge fittings 6 and 7, respectively, and, on the other side, identical hinge fittings (not shown in the drawing).

The hinge fittings 6 and 7 are articulated on the downstream end 8, in the direction of flow of the jet, of a control jack 9, via connecting rods 10 and 11. The other end 12 of the control jack 9 is fixed to the outer surface of the jet generator 5 via a frame 13.

Similarly, the other hinge fittings (hidden by the jet generator 5 in FIG. 1) are articulated on the downstream end of a locking device (not visible).

It will be noted that a detailed description of the articulation of the thrust reversal doors for an aircraft engine is given in French Pat. No. 2,494,775.

According to the invention, an at least partially supple seal 14 is provided between the opposite parts, in folded position of the doors 3 and 4, of the inner surface 4.1 and outer surface 5.1, respectively, of the door 4 and of the jet generator 5 (an identical seal is provided between the door 3 and the generator 5, which seal is not shown in FIG. 1 in order to render the drawing clearer).

The transverse section of the seal 14 is continually adapted (as will be seen in greater detail in the following specification with reference to FIGS. 2 to 4) to the space between the door and the jet generator in retracted position of the door, and the seal 14 is designed so that it is applied all the more strongly on the door 4 (or 3) as the pressure prevailing in the space between the door and the jet generator is greater.

It will be readily appreciated that, depending on the position of the seal 14 on the jet generator 5, the area defined by the seal 14 between the opposite parts of the inner surface 4.1 and outer surface 5.1, respectively, of the door 4 and of the jet generator 5, may vary as desired depending on the particular embodiment envisaged, this making it possible to limit the area of the inner surface 4.1 of the door 4 on which is exerted the pressure prevailing between the door 4 and the jet generator 5. This characteristic is particularly interesting when it is necessary, for reasons of security, to over-retract the doors before being able to extend the latter, as the area thus defined by the seal 14 may then be determined so that the power of the means allowing said over-reaction may remain within acceptable limits in order not to attain an excessive value.

Referring now more particularly to FIGS. 2 to 4, the seal 14 is constituted by a rigid seal support 15 fixed (by any appropriate means 16) to the outer surface 5.1 of the jet generator 5, and by an elastic strip 17 fixed, at one of its longitudinal edges, to the seal support 15 by appropriate fixation means 18 and of which the other longitudinal edge (the free edge 17.1 of the strip 17) is intended to come into contact with the inner surface 4.1 of the door 4. The elastic strip 17 is preferably made of rubber or reinforced silicon.

As may be seen in FIG. 1, the seal support 15 presents a central part 25a which is at least substantially transverse to the jet generator 5 and of which the curvature corresponds to that of the corresponding part of the outer surface 5.1 of the jet generator 5, and two symmetrical lateral parts (of which only one, 25b, is visible in FIG. 1), which are each disposed substantially at right angles with respect to the central part 25a, and which extend parallel to the lateral edges 4a of the door 4 and in the vicinity thereof in retracted position of the door.

The seal support 15 is constituted, in this embodiment, by a section presenting a web 15a and inner and outer flanges 15b, 15c, respectively, the inner flange 15b serving to fix the support on the outer surface 5.1 of the jet generator 5 and the outer flange 15c serving to fix the elastic strip 17.

As shown in FIGS. 2 to 4, the inclination of the web 15a of the seal support 15 with respect to a plane tangential to the outer surface 5.1 of the jet generator increases continuously from each end of the seal support 15, the end being fixed to the surface 5.1 by a fixing plate 19 (FIG. 5), in order to attain, in the vicinity of the centre of the central part 25a of the seal support 15, a value of approximately 90° (FIG.2).

Referring to FIG. 6 maneuvering control jacks makes it possible, via the connecting rods 10 and 11, to extend the doors 3 and 4, which take the position shown in FIG. 1 and indicated by P1 in FIG. 6. In extended position, doors 3 and 4 may be locked by a mechanical device (not shown).

Reverse maneuvering of the control jacks makes it possible, likewise via the connecting rods 10 and 11, to return the doors 3 and 4 into folded position along the jet generator 5 and, more precisely, along the cold jet duct 5b when said jet generator 5 comprises a hot jet generator 5a and a peripheral cold jet duct 5b. In fact, doors 3 and 4 may take either a position of normal retraction, designated by P2 in FIG. 6, for which the section of said doors continues that of the part 1, or a position of over-retraction, designated by P3 in FIG. 6, for which the section of said doors is recessed with respect to the fairing of part 1.

Referring still to FIG. 6, the seal 14 is arranged so that, in position of normal retraction P2, the free edge 17.1 of the strip 17 is applied on the inner surface of the corresponding thrust reversal door, this all the more strongly as the pressure prevailing between the door and the jet generator, in fact the outer surface 5.1 of the peripheral cold jet duct 5b in the case illustrated, is greater. In this way, the tightness will be better as the internal pressure is greater. On the other hand, in the case of depression between the door and the jet generator, the seal, performing the role of a valve, will allow all the ambient air which may be naturally sucked in, to enter (the arrow in broken lines in FIG. 6 represents the admission of ambient air, strip 17 being in that case in the position shown in broken lines).

Moreover, FIG. 6 clearly shows that, as the position of the seal 14 may be chosen on the outer surface of the peripheral cold jet duct 5b in variable manner in longitudinal direction D thereof, the area of the inner surface of the door 3, 4 on which said internal pressure is applied may be limited so that the means for over-retracting said door in position P3 have overcome only a lesser resistance. This makes it possible, in particular, to extend the doors more rapidly into position P1 and thus to optimize the braking distance.

Nevertheless, when choosing the position of seal 14, account must also be taken of the fact that the internal pressure between the door and the jet generator must maintain a sufficient value, as it also performs a role of self-locking, preventing untimely extension of the reverser, in the sense that, before any extension, the doors must firstly be over-retracted.

WHAT IS CLAIMED IS:

1. A thrust reverser for an aircraft jet engine having a jet generator, comprising:
   at least one door mounted at the downstream end with respect to the jet generator to pivot about an axis which is transverse and at least substantially diametral to the jet from the jet generator;
   means for pivoting the door between a retracted position in which it forms a part of the nozzle of the engine and an extended position in which it is disposed at least substantially transverse to the jet, a space between the door and the jet generator being provided when the door is in its retracted position; and
   an at least partly elastic seal provided between the opposite parts of the inner and outer surfaces, respectively, of the door and the jet generator, the transverse section of the seal being configured to intimately contact the inner and outer surfaces for confining gas flow from the jet genrerator to exit from the jet engine at the downstream end of the jet generator only when the door is in its retracted position, the elastic property of the seal causing it to be pressed with increasing pressure to the contacting surface of the door, or the jet generator, as the pressure existing in the space between the door and the jet generator becomes higher, to thereby assist in preventing gas flow in the space from leaking upstream around the seal to the ambient environment, the elastic property of the seal further causing it to part from intimate contact with either the inner or outer surfaces when the pressure existing within the space between the door and the jet generator becomes less than that of the ambient environment to thereby allow air to be sucked into the space to equalize the pressure existing within the space to that of the environment.

2. Thde thrust reverser of claim 1, further comprising:
   means for over-retracting the door, the power of the over-retracting means remaining within acceptable limits for overcoming the pressure existing between the door and the jet generator and defined by the seal.

3. The thrust reverser of claim 1, wherein the seal comprises:
   a rigid seal support fixed to the outer surface of the jet generator, and capable of contacting the inner surface of the door, respectively; and
   an elastic strip fixed, at one of its longitudinal edges, to said seal support, the other longitudinal edge of the elastic strip being adapted to come into contact with the inner surface of the door.

4. A thrust reverser for an aircraft jet engine having a jet generator, comprising:
   at least one door mounted at the downstream end with respect to the jet generator to pivot about an axis which is transverse and at least substantially diametral to the jet from the jet generator;
   means for pivoting the door between a retracted position in which it forms a part of the nozzle of the engine and an extended position in which it is disposed at least substantially transverse to the jet, a space between the door and the jet generator being provided when the door is in its retracted position; and
   an at least partly elastic seal provided between the opposite parts of the inner and outer surfaces, respectively, of the door and the jet generator, the transverse section of the seal being configured to intimately contact the inner and outer surfaces for confining gas flow from the jet generator to exit from the jet engine at the downstream end of the generator when the door is in its retracted position, the elastic property of the seal causing it to be pressed with increasing pressure to the contacting surface of the door, or the jet generator, as the pressure existing in the space between the door and the jet generator becomes higher, to thereby assist in preventing gas flow in the space from leaking upstream around the seal to the ambient environment;
   wherein the seal includes:
   a rigid seal support fixed to the outer surface of the jet generator, and capable of contacting the inner surface of the door, respectively;
   the seal support being fixed to the outer surface of the jet generator and including:
   a central part which is at least substantially transverse to the jet generator and the curvature of which corresponds to that of the corresponding part of the outer surface of the jet generator; and
   two symmetrical lateral parts which are each disposed substantially at right angles with respect to the central part and which extend parallel to the lateral edges of the door and in the vicinity thereof in retracted position of the door; and
   an elastic strip fixed, at one of its longitudinal edges, to said seal support, the other longitudinal edge of the elastic strip being adapted to come into contact with the inner surface of the door.

5. The thrust reverser of claim 4, wherein the seal support comprises:
   a section presenting a web and inner and outer flanges, the inner flange being used to fix the support onto the outer surface of the jet generator and the outer flange being used to attach the elastic strip.

6. The thrust reverser of claim 5, wherein the inclination of the web of the seal support with respect to a plane tangential to the outer surface of the jet generator increase continuously from each end of the seal support to attain, in the vicinity of the centre of the central part of the seal support, a value of approximately 90°.

7. The thrust reverser of claim 3, wherein said elastic strip is made of rubber or reinforced silicon.

8. An aircraft jet engine having a hot jet generator and a peripheral cold jet duct surrounding the hot jet generator, and a thrust reverser, the jet engine comprising:
- at least one door mounted at the downstream end with respect to the jet generator to pivot about an axis which is transverse and at least substantially diametral to the jet from the generator;
- means for pivoting the door between a retracted position in which it forms a part of the nozzle of the engine and an extended position in which it is disposed at least substantially transverse to the jet, a space being provided between the door and the jet generator when the door is in its retracted position;
- an at least partly elastic seal provided between opposed inner and outer surfaces, respectively, of the door and the peripheral cold jet duct, the transverse section of the seal being configured to intimately contact the inner and outer surfaces when the door is in its retracted position, the elastic property of the seal causing it to be pressed with increasing pressure to the contacting surfac of the door, or the cold jet duct, as the pressure existing in the space between the door and the cold jet duct becomes higher, to thereby assist in preventing gas flow in the space from leaking upstream around the seal to the ambient environment, the elastic property of the seal further causing it to part from intimate contact with the contacting surface of either the door or the cold jet duct when the pressure existing within the space between the door and the jet generator becomes less than that of the ambient environment to thereby allow air from the ambient environment to be sucked into the space to equalize the pressure existing within the space to that of the environment.

9. In a thrust reverser for an aircraft jet engine having a jet generator, at least one door mounted at the downstream end with respect to the jet generator to pivot about an axis which is transverse and at least substantially diametral to the jet from the jet generator, and means for pivoting the door between a retracted position in which it forms a part of the nozzle of the engine and an extended position in which it is disposed at least substantially transverse to the jet, a space being provided between the door and the jet generator when the door is in its retracted position, wherein, when the door is in its retracted position, the method of limiting the area of the inner surface of the door onto which pressure existing in the space between the door and jet generator exerts, comprises the steps of:
- providing an at least partly elastic seal between opposed inner and outer surfaces of the door and jet generator, respectively;
- configuring the transverse section of the seal to intimately contact the inner and outer surfaces when the door is in its retracted position, the elastic property of the seal causing it to be pressed with increasing pressure to the contacting surface of the door, or to the jet generator, as the pressure existing in the space between the door and the jet generator becomes higher, to thereby assist in preventing gas flow in the space from leaking upstream around the seal to the ambient environment, the elastic property of the seal further causing it to part from intimate contact with the contacting surface of either the door or the cold jet duct when the pressure existing within the space between the door and the jet generator becomes less than that of the ambient environment to thereby allow air from the ambient environment to be sucked into the space to equalize the pressure existing within the space to that of the environment; and
- choosing an area defined by the seal between the opposed inner and outer surfaces for limiting the area of the inner surface of the door onto which the pressure existing between the door and the jet generator exerts.

* * * * *